(12) United States Patent
Kudo et al.

(10) Patent No.: US 12,248,982 B2
(45) Date of Patent: Mar. 11, 2025

(54) INFORMATION PROCESSING DEVICE

(71) Applicant: TOYOTA JIDOSHA KABUSHIKI KAISHA, Toyota (JP)

(72) Inventors: Yuki Kudo, Susono (JP); Kazutaka Kimura, Mishima (JP); Kazuki Obata, Susono (JP); Hiromitsu Kigure, Ashigarakami-gun (JP); Satoshi Kikuchi, Hadano (JP); Yuta Maniwa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 221 days.

(21) Appl. No.: 17/943,535

(22) Filed: Sep. 13, 2022

(65) Prior Publication Data

US 2023/0102260 A1    Mar. 30, 2023

(51) Int. Cl.
| G06Q 30/00 | (2023.01) |
| G06Q 30/0283 | (2023.01) |
| G06Q 30/04 | (2012.01) |
| G06Q 30/08 | (2012.01) |
| G06Q 50/06 | (2012.01) |

(52) U.S. Cl.
CPC ......... *G06Q 30/08* (2013.01); *G06Q 30/0283* (2013.01); *G06Q 30/04* (2013.01); *G06Q 50/06* (2013.01)

(58) Field of Classification Search
CPC .......................... G06Q 30/08; G06Q 30/0283
See application file for complete search history.

(56) References Cited

U.S. PATENT DOCUMENTS

| 2012/0166616 | A1 | 6/2012 | Meehan et al. | |
| 2018/0204293 | A1* | 7/2018 | Bazhinov | H02B 1/056 |
| 2021/0141409 | A1* | 5/2021 | Ellice-Flint | H02J 3/381 |

FOREIGN PATENT DOCUMENTS

| JP | 2015-230544 A | 12/2015 |
| JP | 2019-096164 A | 6/2019 |
| JP | 2020-078124 A | 5/2020 |
| JP | 2021-117731 A | 8/2021 |
| JP | 2021-145533 A | 9/2021 |

* cited by examiner

*Primary Examiner* — Rokib Masud
(74) *Attorney, Agent, or Firm* — Oliff PLC

(57) ABSTRACT

A market electric power price predicting unit predicts a trading price of electric power traded in a P2P electric power trading market. The trading price includes a price of renewable energy electric power and a price of non-renewable energy electric power. A renewable energy index setting unit sets a renewable energy index indicating a degree of the renewable energy electric power in electric power purchased in the P2P electric power trading market. A trading price setting unit sets a desired trading price in an electric power trading plan from a prediction result of the trading price of the electric power and the renewable energy index. A trading plan creating unit creates the electric power trading plan based on the desired trading price.

9 Claims, 12 Drawing Sheets

FIG. 6

RESOURCE INFORMATION TABLE

| ID | A1 |
|---|---|
| CATEGORY INFORMATION | ELECTRIFIED VEHICLE |
| TRIP INFORMATION | T1 |
| SOC INFORMATION | S1 |
| CONNECTION INFORMATION | D1 |
| BIDDING INFORMATION | B1 |
| CONTRACT INFORMATION | Y1 |
| CHARGE AND DISCHARGE PLAN | P1 |
| CHARGE AND DISCHARGE RECORD | J1 |

FIG. 7

AGENT INFORMATION TABLE

| ID | CATEGORY INFORMATION | BIDDING INFORMATION | CONTRACT INFORMATION |
|---|---|---|---|
| A1 | MOBILE BODY | a11 | a21 |
| A2 | MOBILE BODY | a12 | a22 |
| ... | ... | ... | ... |
| B1 | OPERATOR | b11 | b21 |
| B2 | OPERATOR | b12 | b22 |
| ... | ... | ... | ... |
| C1 | HOUSE | c11 | c21 |
| C2 | HOUSE | c12 | c22 |
| ... | ... | ... | ... |

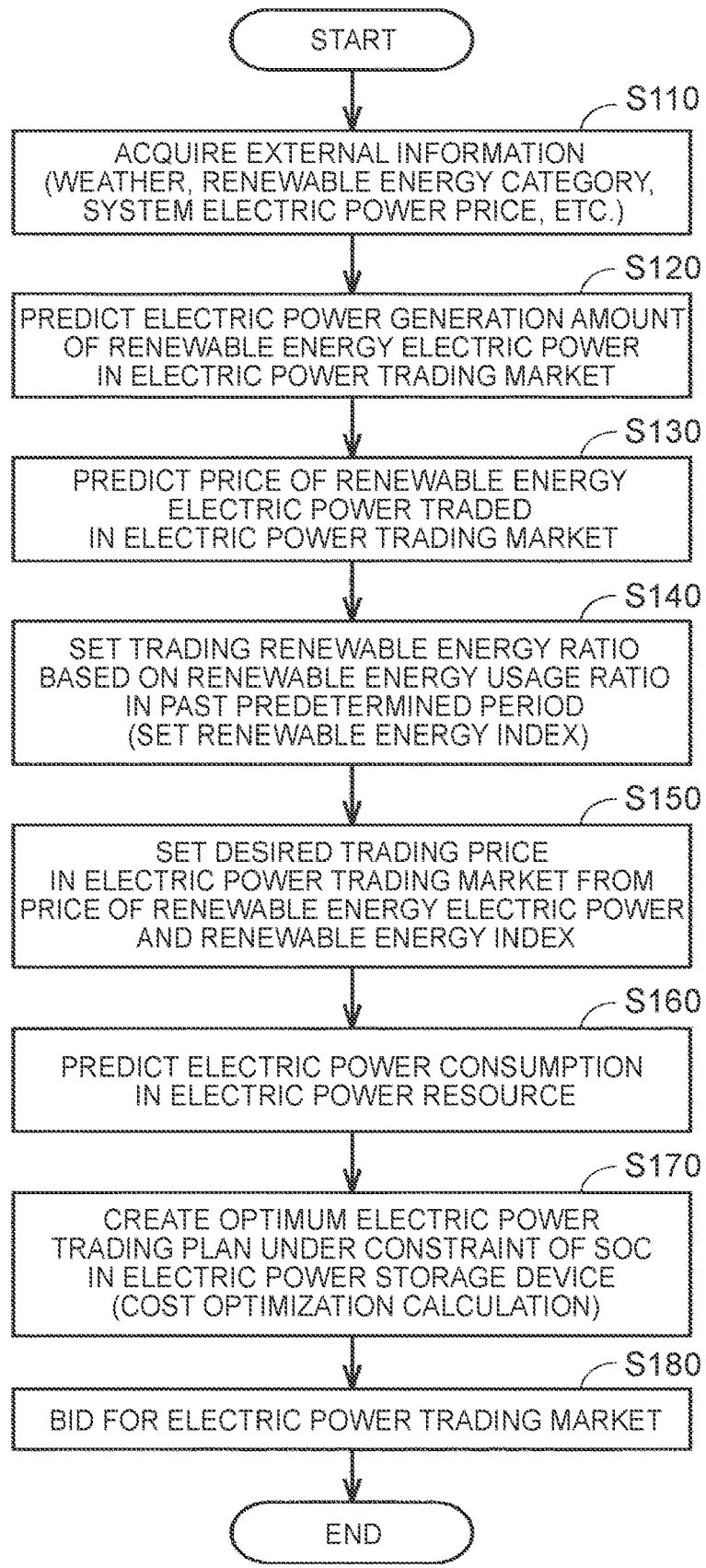

INFORMATION PROCESSING DEVICE

CROSS-REFERENCE TO RELATED APPLICATION

This application claims priority to Japanese Patent Application No. 2021-159140 filed on Sep. 29, 2021, incorporated herein by reference in its entirety.

BACKGROUND

1. Technical Field

The present disclosure relates to an information processing device, and more particularly to an information processing device for creating an electric power trading plan for causing an electric power resource to conduct electric power trading through an electric power trading market.

2. Description of Related Art

With an increase in renewable energy, as an electric power resource for securing adjustment power necessary to maintain a balance between supply and demand of electric power, use of a mobile body equipped with a battery (battery electric vehicle, etc.) or a facility equipped with a stationary battery (house, factory, etc.) is considered. For example, Japanese Unexamined Patent Application Publication No. 2020-78124 (JP 2020-78124 A) describes that a charge and discharge plan is created for a mobile body equipped with a battery (electric power resource) according to an electric power category such as system electric power or renewable energy electric power (see JP 2020-78124 A).

SUMMARY

Due to liberalization of electric power, introduction of peer-to-peer (P2P) electric power trading in which electric power trading is directly conducted between an individual or corporation having an electric power resource and another individual or corporation is considered in an electric power trading market. In such electric power trading, a trading price in the electric power trading market can be predicted to create an electric power trading plan (bidding plan). Here, when it is desired to adjust the degree of procurement of renewable energy electric power in the electric power trading, an issue is how to incorporate the desired degree of procurement of the renewable energy electric power in the above-mentioned electric power trading plan.

Therefore, an object of the present disclosure is to provide an information processing device capable of creating an electric power trading plan in consideration of the degree of procurement of the renewable energy electric power in the P2P electric power trading.

The information processing device according to the present disclosure is an information processing device that creates an electric power trading plan for causing an electric power resource to conduct electric power trading through an electric power trading market. The electric power resource is configured to be able to receive electric power at least from outside the electric power resource. The information processing device includes a price predicting unit, an index setting unit, a trading price setting unit, and a trading plan creating unit. The price predicting unit predicts a trading price of electric power traded in the electric power trading market. The trading price includes a first price that indicates a price of renewable energy electric power and a second price that indicates a price of non-renewable energy electric power that is not applicable to the renewable energy electric power. The index setting unit sets a renewable energy index indicating a degree of the renewable energy electric power in electric power purchased in the electric power trading market. The trading price setting unit sets a desired trading price in the electric power trading plan from a prediction result of the price predicting unit and the renewable energy index. The trading plan creating unit creates the electric power trading plan based on the desired trading price.

In this information processing device, a price of electric power (renewable energy electric power and non-renewable energy electric power) traded in the electric power trading market is predicted. Then, the desired trading price in consideration of the degree of procurement of the renewable energy electric power is set from the predicted electric power price and the set renewable energy index, and the electric power trading plan is created based on the desired trading price. As described above, according to the above information processing device, it is possible to create the electric power trading plan in consideration of the degree of procurement of the renewable energy electric power.

The information processing device may further include an electric power generation amount predicting unit that predicts an electric power generation amount of the renewable energy electric power traded in the electric power trading market. Then, the price predicting unit may predict the first price based on a prediction result of the electric power generation amount predicting unit.

The electric power generation amount predicting unit may predict the electric power generation amount of the renewable energy electric power based on weather information of an area covered by the electric power trading market.

With the above configuration, the price of the renewable energy electric power can be appropriately predicted based on the prediction of the electric power generation amount of the renewable energy electric power. As a result, the desired trading price is appropriately set, and the appropriate electric power trading plan can be created based on the desired trading price.

The information processing device may further include an electric power consumption predicting unit that predicts electric power consumption of the electric power resource. Then, the trading plan creating unit may create the electric power trading plan from the desired trading price and a prediction result of the electric power consumption predicting unit.

As a result, it is possible to create the appropriate electric power trading plan on which the electric power consumption of the electric power resource is reflected.

The renewable energy index may be a ratio of the renewable energy electric power in the electric power purchased in the electric power trading market, the ratio of the renewable energy electric power being set based on input from a user.

Therefore, it is possible to create the electric power trading plan on which user's wish is reflected for the above ratio of the renewable energy electric power.

The index setting unit may set the renewable energy index based on a ratio of the renewable energy electric power in the electric power purchased in the electric power trading market in a predetermined period.

This makes it possible to create the electric power trading plan based on the above ratio of the renewable energy electric power in the past predetermined period. For example, when the above ratio of the renewable energy electric power in the predetermined period is low, the electric power trading plan can be created such that the ratio is increased.

The trading price setting unit may set the desired trading price based on the prediction result of the price predicting unit and the ratio of the renewable energy electric power set according to the renewable energy index.

According to this information processing device, it is possible to create the electric power trading plan in consideration of the ratio of the renewable energy electric power set according to the renewable energy index.

The index setting unit may set the renewable energy index based on a predetermined law applied to the electric power resource.

As a result, it is possible to create the electric power trading plan on which the predetermined law applied to the electric power resource is reflected. For example, when the usage ratio of the renewable energy electric power is stipulated in the ordinance as a condition for entering a certain area, it is possible to create the electric power trading plan that satisfies the condition for the usage ratio of the renewable energy electric power.

The index setting unit may set the renewable energy index based on a predetermined tax system applied to the electric power resource.

As a result, it is possible to create the electric power trading plan on which the predetermined tax system applied to the electric power resource is reflected. For example, when the tax rate is set by the usage ratio of the renewable energy electric power, it is possible to create the electric power trading plan at the desired ratio of the renewable energy electric power in consideration of the tax rate.

With the information processing device according to the present disclosure, it is possible to create the electric power trading plan in consideration of the degree of procurement of the renewable energy electric power in the P2P electric power trading.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram showing an example of resource information;

FIG. 7 is a diagram showing an example of agent information;

FIG. 12 is a flowchart showing an example of a processing procedure executed when the agent according to the second embodiment bids for a P2P electric power trading market.

DETAILED DESCRIPTION OF EMBODIMENTS

Figure 1:
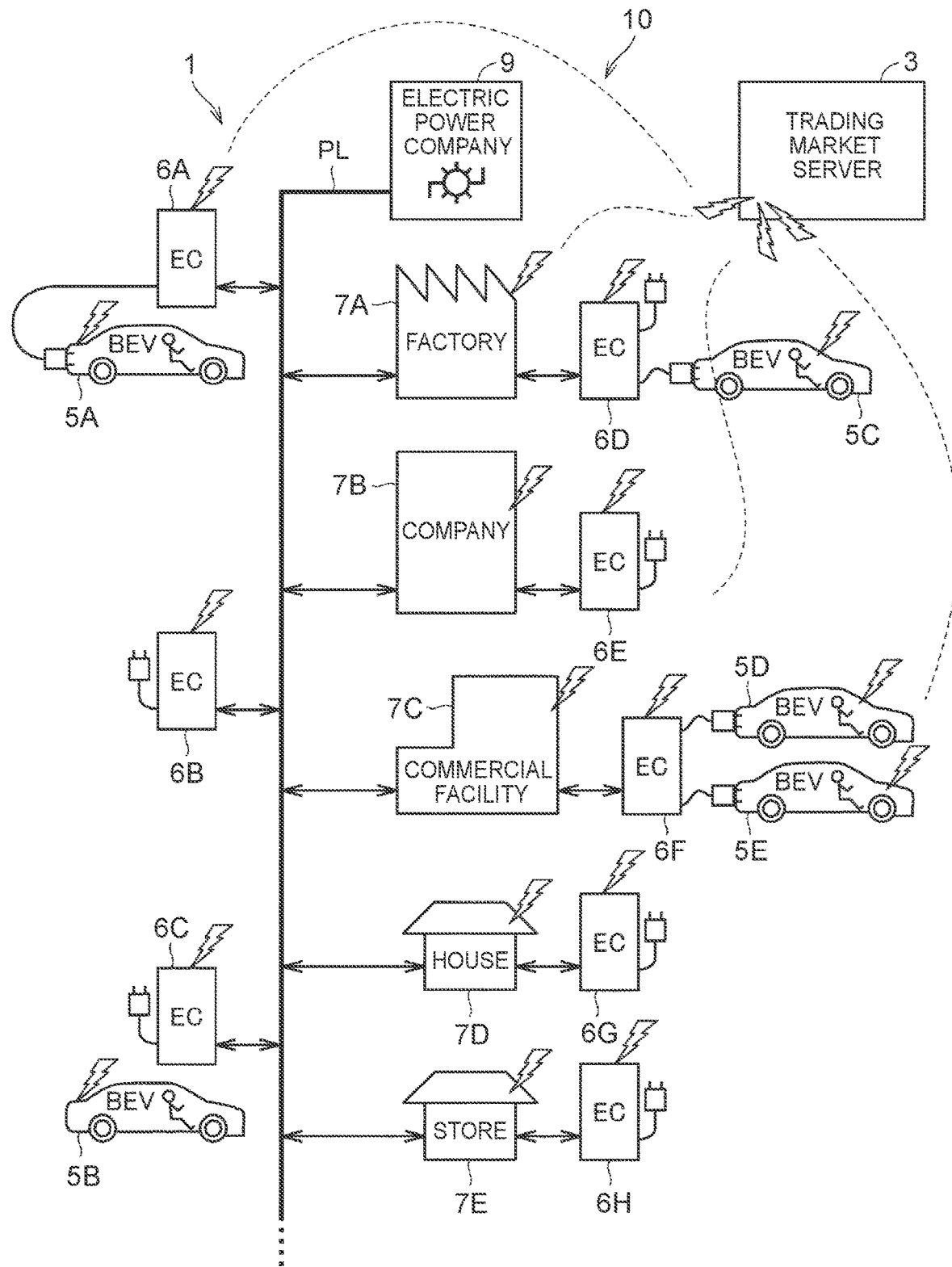
FIG. 1 is a diagram schematically showing a configuration example of an electric power transmission and distribution system for electric power to be traded using an information processing device according to a first embodiment.

Hereinafter, embodiments of the present disclosure will be described in detail with reference to the drawings. The same or corresponding parts in the drawings are designated by the same reference signs and the description thereof will not be repeated.

First Embodiment

FIG. 1 is a diagram schematically showing a configuration example of an electric power transmission and distribution system for electric power to be traded using an information processing device according to a first embodiment. With reference to FIG. 1, an electric power transmission and distribution system 1 includes multiple electric power resources, charge and discharge facilities 6A to 6H, an electric power company 9, a transmission line network PL, a trading market server 3, and a communication network 10.

The multiple electric power resources include, for example, electrified vehicles 5A to 5E, a factory 7A, a company 7B, a commercial facility 7C, a house 7D, and a store 7E. Each electric power resource is configured to be able to transfer and receive electric power to and from other electric power resources, either through the transmission line network PL or directly.

The number of electrified vehicles and the number of charge and discharge facilities are not limited to the numbers shown in the drawings. Further, the facilities such as the factory 7A are not limited to those shown in the drawings. In the following, each of the electrified vehicles 5A to 5E may not be distinguished and be referred to as the "electrified vehicle 5", and each of the charge and discharge facilities 6A to 6H may not be distinguished and be referred to as the "charge and discharge facility 6". Further, each of the factory 7A, the company 7B, the commercial facility 7C, the house 7D, and the store 7E may not be distinguished and be referred to as the "facility 7".

The electrified vehicle 5 is an electrified vehicle that can travel by using electric power stored in a battery, and is, for example, a battery electric vehicle (BEV), a plug-in hybrid electric vehicle (PHEV), or the like. In the following, the electrified vehicle 5 is referred to as the BEV. The electrified vehicle 5 is configured to be electrically connectable to the charge and discharge facility 6, and can transfer and receive electric power to and from the transmission line network PL or the facility 7 through the charge and discharge facility 6.

The facility 7 is electrically connected to the transmission line network PL, and can transfer and receive electric power to and from the transmission line network PL. The facility 7 is also electrically connected to the charge and discharge facility 6, and can transfer and receive electric power to and from the electrified vehicle 5 connected to the charge and discharge facility 6.

The charge and discharge facility 6 is electrically connected to the transmission line network PL or the facility 7. The charge and discharge facility 6 is electrically connectable to the electrified vehicle 5 through an electric power cable, and the electrified vehicle 5 can transfer and receive electric power to and from the transmission line network PL or the facility 7 through the charge and discharge facility 6 that is a connection destination.

The electric power generated by an electric power plant managed by the electric power company 9 can be supplied to each facility 7 through the transmission line network PL (system electric power grid), and can also be supplied to the electrified vehicle 5A connected to the charge and discharge facility 6A. Conventionally, the electric power has been supplied to the facility 7 and the electrified vehicle 5 exclusively from the electric power plant of the electric power company 9 through the transmission line network PL as described above. In this electric power transmission and distribution system 1, the electric power trading between individuals or corporations (each facility 7 or each electrified vehicle 5), that is, the P2P electric power trading, can be conducted.

The trading market server 3 provides a platform for conducting such P2P electric power trading. The trading market server 3 is configured to be able to communicate with the electrified vehicle 5, the charge and discharge facility 6, and the facility 7 through the communication network 10. When the facility 7 or the electrified vehicle 5 desires the P2P electric power trading, the facility 7 or the electrified vehicle 5 (specifically, an agent that conducts the electric power trading of the facility 7 or the electrified vehicle 5 (described below)) bids for the trading market server 3 that manages the P2P electric power trading market in which the electric power trading is desired, by specifying, for example, a time zone in which the electric power is desired to be sold or purchased, the electric energy to be sold or purchased for each unit time zone, the trading price, and the like as bidding conditions. The trading market server 3 uses any algorithm to activate a contract of the electric power trading between a seller and a buyer of which the bidding conditions match, and processes bidding in which the bidding conditions do not match as a non-contract trading. In addition, the "bidding" means an act of ordering the electric power trading (purchase or sale), or the order itself. The "contract" means an act of determining to conduct the electric power trading for which the agent has bid, or the determination itself.

Figure 2:
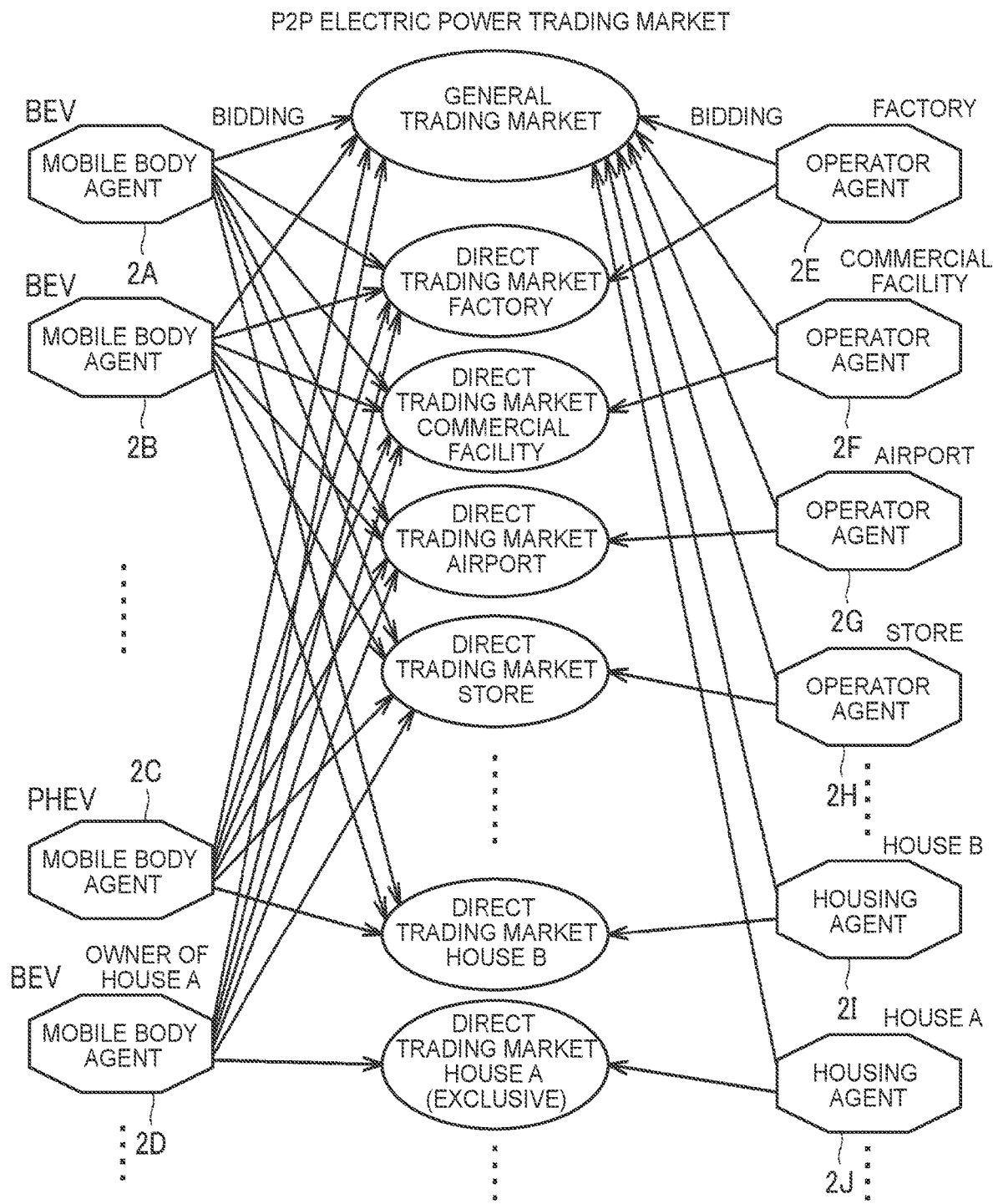
FIG. 2 is a diagram schematically showing an example of a peer-to-peer (P2P) electric power trading market.

FIG. 2 is a diagram schematically showing an example of the P2P electric power trading market. With reference to FIG. 2, in the P2P electric power trading market, the "agent" who bids for the P2P electric power trading market creates and executes the bidding plan, manages the contract, creates a charge and discharge plan based on the contract, and the like. The agent is provided for each facility 7 or the electrified vehicle 5, and in the first embodiment, there are multiple mobile body agents 2A to 2D corresponding to the electrified vehicles 5, multiple operator agents 2E to 2H corresponding to the factory 7A and the like, and multiple housing agents 2I and 2J corresponding to the houses. For example, to explain the electrified vehicle 5 as a representative, the mobile body agent of the electrified vehicle 5 creates the electric power trading plan (bidding plan) for the P2P electric power trading market, and the mobile body agent bids for the P2P electric power trading market (trading market server 3).

In the following, the mobile body agents 2A to 2D, the operator agents 2E to 2H, and the housing agents 2I and 2J may not be distinguished and be simply referred to as the "agent 2". The agent 2 is an "information processing device" that creates the electric power trading plan for causing the corresponding electric power resource to conduct the electric power trading through the P2P electric power trading market.

In the P2P electric power trading market, there are a "general trading market" and a "direct trading market". The general trading market is a market in which electric power transmitted through the transmission line network PL is traded, and an unspecified large number of agents 2 can participate in the electric power trading. In the general trading market, the contract of the electric power trading is made according to a rule set as appropriate by an administrator who manages the P2P electric power trading market (matching). As a matching rule, for example, there is a method of concluding the trading transaction on a first-come-first-served basis when the asking price of the seller and the asking price of the buyer match in a predetermined unit time zone. As another matching rule, a method can be also adopted in which the bidding (order) of the seller and the buyer that are made in the unit time zone is organized temporarily and then the trading transaction is concluded at an appropriate price.

Figure 3:
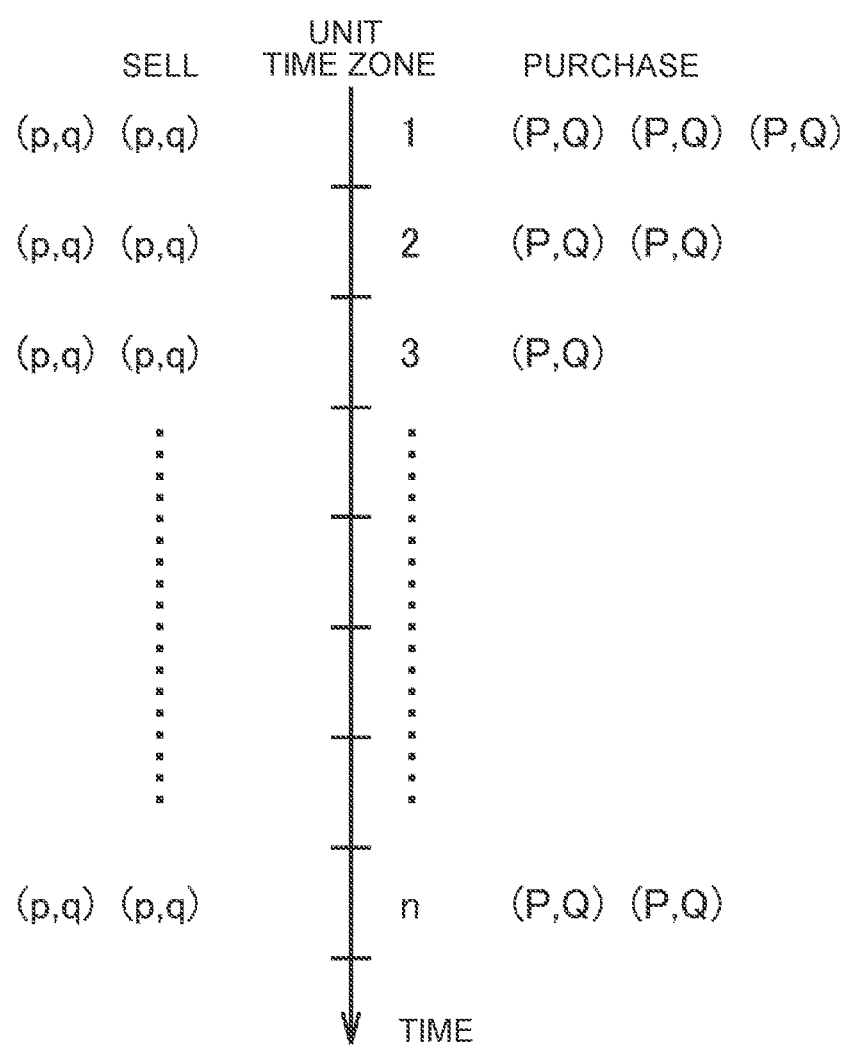
FIG. 3 is a diagram illustrating an example of bidding in a general trading market for the P2P electric power trading.

FIG. 3 is a diagram illustrating an example of bidding in the general trading market for the P2P electric power trading. With reference to FIG. 3, in the general trading market, for each predetermined unit time zone (1, 2, . . . n), an unspecified large number of sellers bid a set of selling price and electric energy (p, q), and an unspecified large number of buyers bid a set of purchase price and electric energy (P, Q). The unit time zone is a time width (for example, 30 minutes) set in the general trading market. The trading of the electric energy is conducted for each electric energy (electric power×unit time zone length) transmitted in the unit time zone.

With reference to FIG. 2 again, the direct trading market is a market in which the electrified vehicle 5 moves to the location of the facility 7 and the trading of the electric power transmitted without going through the transmission line network PL is conducted, and only an agent having identification (ID) of the direct trading market can participate in the electric power trading. In the direct trading market, one market is configured for the facility 7 in which the charge and discharge facility 6 is installed. A server provided for each facility 7 may manage one direct trading market, or a common server may manage multiple direct trading markets by multiple facilities 7. In the direct trading market, the contract of the electric power trading is made according to a rule uniquely set as appropriate by an administrator in each market (matching). As the matching rule, the above method described in the general trading market can be adopted.

Figure 4:
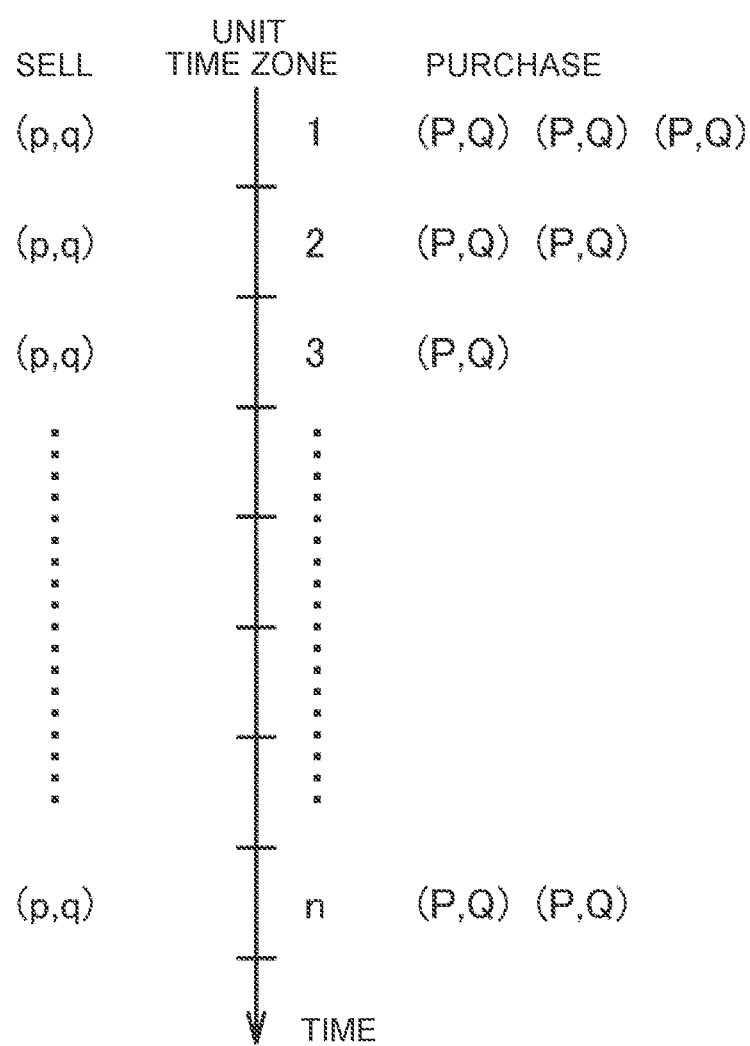
FIG. 4 is a diagram illustrating an example of bidding in a direct trading market for the P2P electric power trading.

FIG. 4 is a diagram illustrating an example of bidding in the direct trading market for the P2P electric power trading. With reference to FIG. 4, in the direct trading market, for each predetermined unit time zone (1, 2, . . . n), a seller proposes a set of selling price and electric energy (p, q), and multiple buyers having ID of the direct trading market bid a set of purchase price and electric energy (P, Q). The unit time zone is a time width set individually in the direct trading market. The trading of the electric energy is conducted for each electric energy (electric power×unit time zone length) transmitted in the unit time zone.

Figure 5:
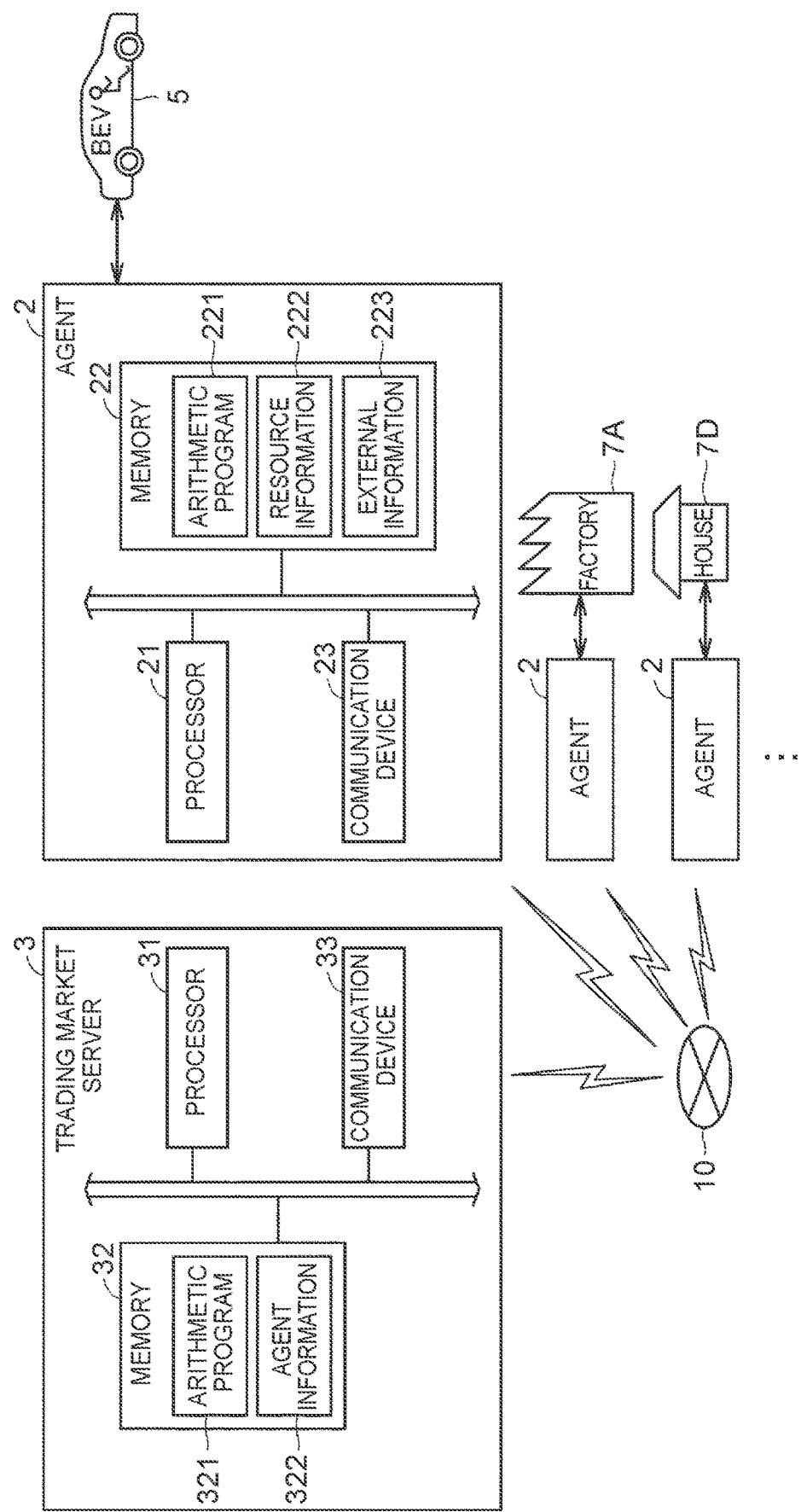
FIG. 5 is a diagram showing an example of hardware configurations of an agent and a trading market server.

FIG. 5 is a diagram showing an example of hardware configurations of the agent 2 and the trading market server 3. With reference to FIG. 5, the agent 2 includes a processor 21, a memory 22, and a communication device 23. The agent 2 is provided for each electric power resource such as the electrified vehicle 5 and the facility 7 (factory 7A, house 7D, etc.). The agent 2 may be provided in the corresponding electric power resource, or may be provided in the cloud capable of communicating with the corresponding electric power resource.

The processor 21 is an arithmetic unit (computer) that executes various processes by executing various programs. The processor 21 is composed of a central processing unit (CPU), a field-programmable gate array (FPGA), a graphics processing unit (GPU), and the like. The processor 21 may be configured by a processing circuitry.

The memory 22 stores programs and data for the processor 21 to execute various processes. The memory 22 is composed of a storage medium such as a read-only memory (ROM) and a random access memory (RAM). The memory 22 stores an arithmetic program 221, resource information 222, and external information 223.

The arithmetic program 221 specifies processes executed by the processor 21. For example, the arithmetic program 221 includes a program for making a bid regarding the electric power trading in the P2P electric power trading market managed by the trading market server 3 for the trading market server 3.

The resource information 222 includes information on the electric power resource corresponding to the agent 2 (for example, the electrified vehicle 5), and particularly includes information on bidding and the contract of the electric power trading.

FIG. 6 is a diagram showing an example of the resource information 222. In FIG. 6, as an example, the resource information 222 in the agent 2 (mobile body agent) of the electrified vehicle 5 is shown.

With reference to FIG. 6, the resource information 222 includes ID, category information, trip information, state of charge (SOC) information, connection information, bidding information, contract information, the charge and discharge plan, and a charge and discharge record.

The ID includes identification information for identifying the electric power resource (electrified vehicle 5 in this example). The category information includes information on a category of the electric power resource, and includes, for example, information for identifying the electrified vehicle, the operator, the house, and the like. The trip information includes information on a travel history such as the past travel route and the travel time. The SOC information includes information on the electric energy currently stored in an electric power storage device. The connection information includes information for identifying whether the electrified vehicle 5 is currently connected to the charge and discharge facility 6. The bidding information includes information on the past bidding history and information on the bidding currently in progress. The contract information includes information on the past contract history and information for identifying whether the contract is made for the bidding currently in progress. The charge and discharge plan includes information on the charge and discharge plan of the electric power resource based on the contract. The charge and discharge record includes information on a charge and discharge result for the above charge and discharge plan.

The trip information and the connection information are information used by the agent 2 (mobile body agent) of the electrified vehicle 5, and as for the facility 7 (factory 7A, house 7D, etc.), the column for such information is left blank.

With reference to FIG. 5 again, the external information 223 includes a price of the system electric power provided by the electric power company 9, weather information (amount of solar radiation, weather, wind speed, etc.) of an area of the P2P electric power trading market for bidding, and information on an electric power generation facility of the renewable energy in the market (solar power generation facility, wind power generation facility, hydroelectric power generation facility, etc.). The agent 2 acquires the external information 223 from an external server device (which may be the trading market server 3) through the communication network 10.

The communication device 23 transmits and receives various data to and from the trading market server 3 through the communication network 10.

The trading market server 3 includes a processor 31, a memory 32, and a communication device 33. The trading market server 3 is a device that manages the P2P electric power trading between the electric power resources in the P2P electric power trading market (general trading market and direct trading market), and executes a process related to the electric power trading.

The processor 31 is an arithmetic unit (computer) that executes various processes by executing various programs. The processor 31 is composed of a CPU, an FPGA, a GPU, and the like. The processor 31 may be configured by a processing circuitry.

The memory 32 stores programs and data for the processor 31 to execute various processes. The memory 32 is composed of a storage medium such as a ROM and a RAM. The memory 32 stores an arithmetic program 321 and agent information 322.

The arithmetic program 321 specifies processes executed by the processor 31. For example, the arithmetic program 321 includes a program for executing a bidding process for accepting the bidding from the multiple agents 2 and a contract process based on the bidding. The contract process is a process in which the contract of the electric power trading is activated between the seller and the buyer of which the bidding conditions match, and bidding in which the bidding conditions do not match is processed as a non-contract trading.

The agent information 322 includes information on the agent 2 participating in the P2P electric power trading market managed by the trading market server 3, and particularly includes information on the bidding and the contract for the electric power trading for each agent 2.

FIG. 7 is a diagram showing an example of the agent information 322. With reference to FIG. 7, the agent information 322 includes ID, category information, bidding information, and contract information.

The ID includes identification information for identifying the agent 2 participating in the P2P electric power trading market managed by the trading market server 3. The category information includes information on a category of the electric power resource, and includes, for example, information for identifying the electrified vehicle, the operator, the house, and the like. The bidding information includes information on the past bidding history for each agent 2 and information on the bidding currently in progress. The contract information includes information on the past contract history for each agent 2 and information for identifying whether the contract is made for the bidding currently in progress.

With reference to FIG. 5 again, the communication device 33 transmits and receives various data to and from the agent 2 through the communication network 10.

In the P2P electric power trading market composed of the agent 2 and the trading market server 3 described above, the agent 2 predicts use of the corresponding electric power resource (in the case of the electrified vehicle 5, a user predicts use of the electrified vehicle 5), and predicts an electric power trading price in the electric power trading market during the time zone when the agent 2 can participate in the electric power trading. Then, the agent 2 creates the electric power trading plan (bidding plan) that will be optimized in terms of cost under the constraint of the upper and lower limits of the SOC (chargeable and dischargeable range) to be satisfied in the electric power storage device of the corresponding electric power resource, and makes a bid regarding the electric power trading for the trading market server 3.

Here, when the agent 2 creates the electric power trading plan, in addition to the viewpoint of cost optimization, there is a case in which it is desired to adjust the degree of procurement of the renewable energy electric power against the background of social needs for improving utilization of the renewable energy. For example, it is considered, when the renewable energy electric power (electric power derived from solar power generation, wind power generation, etc.) is surplus, the degree of procurement of the renewable energy electric power that is expected to reduce the cost is increased, and when the electric power generation amount of the renewable energy electric power is small, the degree of procurement of the renewable energy electric power that can increase the cost is reduced.

Therefore, in the agent 2 according to the first embodiment, the electric power trading plan on which the degree of procurement of the renewable energy electric power can be reflected is created in addition to the viewpoint of cost optimization. Hereinafter, detailed description will be made.

Figure 8:
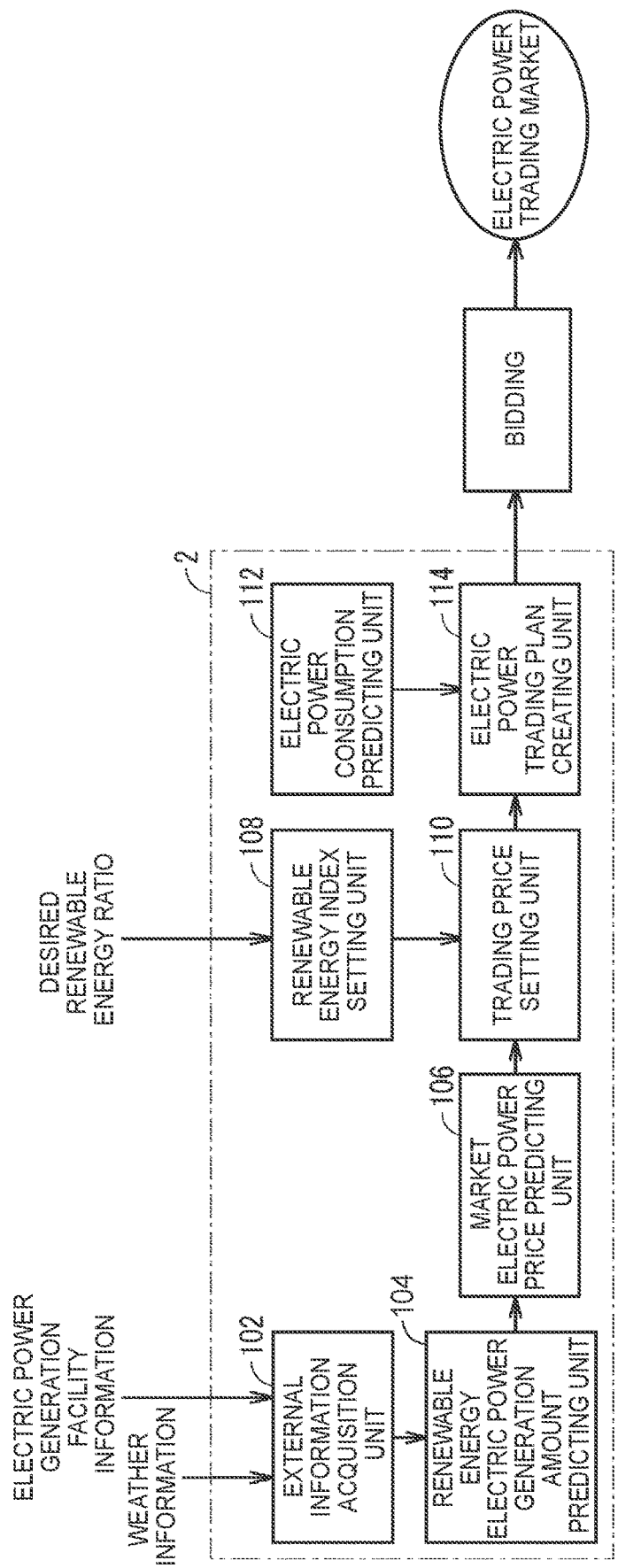
FIG. 8 is a block diagram functionally showing a configuration of the agent according to the first embodiment.

FIG. 8 is a block diagram functionally showing a configuration of the agent 2 according to the first embodiment. With reference to FIG. 8, the agent 2 includes an external information acquisition unit 102, a renewable energy electric power generation amount predicting unit 104, a market electric power price predicting unit 106, a renewable energy index setting unit 108, and a trading price setting unit 110, an electric power consumption predicting unit 112, and an electric power trading plan creating unit 114.

The external information acquisition unit 102 acquires weather information of the area of the P2P electric power trading market for bidding from an external server device (not shown). The weather information is information on the weather forecast of the above area, and includes the forecast information such as the amount of solar radiation, the weather, and the wind speed for each time zone. The P2P electric power trading market for bidding is an electric power trading market in an area where the corresponding electric power resource is desired to be charged and discharged based on the P2P electric power trading, and is determined based on the usage prediction of the corresponding electric power resource. For example, in the case of the agent 2 (mobile body agent) of the electrified vehicle 5, the P2P electric power trading market for bidding can be determined based on the predicted position (for example, the destination) of the electrified vehicle 5.

Further, the external information acquisition unit 102 acquires information on the electric power generation facility of the renewable energy in the P2P electric power trading market for bidding from then external server device (not shown). The electric power generation facility of the renewable energy includes the solar power generation facility, the wind power generation facility, the hydroelectric power generation facility, and the like. Information on the electric power generation facility of the renewable energy includes information on the category and the number of the electric power generation facilities, the rated output or the maximum output of each electric power generation facility in the area covered by the P2P electric power trading market, and the like. The information acquired by the external information acquisition unit 102 is stored in the memory 22 as the external information 223.

The renewable energy electric power generation amount predicting unit 104 predicts the electric power generation amount of the renewable energy in the P2P electric power trading market for bidding based on the weather information and the electric power generation facility information acquired by the external information acquisition unit 102. For example, in the case of the solar power generation facility, when the time zone is daytime, the weather is sunny, and there are many solar power generation facilities, the renewable energy electric power generation amount predicting unit 104 predicts that the electric power generation amount of the renewable energy derived from the solar power generation is large. On the other hand, when the weather is rainy or the time zone is nighttime, the renewable energy electric power generation amount predicting unit 104 predicts that the electric power generation amount of the renewable energy derived from the solar power generation is small. Further, in the case of the wind power generation facility, when the wind is strong and there are many wind power generation facilities, the renewable energy electric power generation amount predicting unit 104 predicts that the electric power generation amount of the renewable energy derived from the wind power generation is large.

The market electric power price predicting unit 106 predicts the price (unit price) of the electric power (purchased electric power and sold electric power) traded in the P2P electric power trading market for bidding. In the P2P electric power trading market according to the first embodiment, the renewable energy electric power derived from the electric power generation facility of the renewable energy and the non-renewable energy electric power (electric power derived from a thermal power generation, etc.) which is not applicable to the renewable energy electric power are separately traded. For example, when the renewable energy electric power is traded, a tag (renewable energy tag) indicating that the traded electric power is the renewable energy electric power is attached, so that the renewable energy electric power can be distinguished from the non-renewable energy electric power. Alternatively, within the P2P electric power trading market, the market dealing with the trading of the renewable energy electric power and the market dealing with the trading of the non-renewable energy electric power may be separated.

Then, in the first embodiment, the market electric power price predicting unit 106 separately predicts the price of the renewable energy electric power (first price) and the price of the non-renewable energy electric power (second price) as for the purchase price. The price of the renewable energy electric power is predicted based on the prediction result of the renewable energy electric power generation amount predicting unit 104.

For example, when the renewable energy electric power generation amount predicting unit 104 predicts that the electric power generation amount of the renewable energy is large, it is expected that a surplus of the renewable energy electric power is generated. Therefore, the market electric power price predicting unit 106 predicts that the price of the renewable energy electric power is low. On the other hand, when the renewable energy electric power generation amount predicting unit 104 predicts that the electric power generation amount of the renewable energy is small, the circulation amount of the renewable energy electric power is limited. Therefore, the market electric power price predicting unit 106 predicts that the price of the renewable energy electric power is high. The high price (low price) may be high (low) with respect to a certain standard price, or may be high (low) with respect to the price of the non-renewable energy electric power.

The price of the non-renewable energy electric power can be predicted based on, for example, the price of the system electric power available from the electric power company 9.

The renewable energy index setting unit 108 sets a "renewable energy index" indicating the degree of the renewable energy electric power in the electric power purchased in the P2P electric power trading market (purchased electric power). In the P2P electric power trading market according to the first embodiment, as described above, the renewable energy electric power and the non-renewable energy electric power can be traded separately, and the renewable energy index setting unit 108 can adjust the degree at which the renewable energy electric power is included at the time of purchasing the electric power.

In the first embodiment, the user of the corresponding electric power resource can set the ratio of the renewable energy electric power in the purchased electric power (desired renewable energy ratio by the user) from an input device (not shown). As for setting of the desired renewable energy ratio by the user, a value of the ratio of the renewable energy electric power may be used as it is or the ratio of the renewable energy electric power may be increased or reduced with respect to a certain reference ratio. The user can set a high desired renewable energy ratio from the input device, for example, when the user wishes to increase the purchase amount of the renewable energy electric power.

The renewable energy index is defined as, for example, an index that increases as the ratio of the renewable energy electric power in the purchased electric power increases and decreases as the ratio of the renewable energy electric power in the purchased electric power decreases. The renewable energy index setting unit 108 sets the renewable energy index based on the desired renewable energy ratio set by the user.

The trading price setting unit 110 sets a desired trading price for bidding for the P2P electric power trading market from the prediction result of the electric power trading price by the market electric power price predicting unit 106 and the renewable energy index set by the renewable energy index setting unit 108. Specifically, the trading price setting unit 110 changes the price (first price) of the renewable energy electric power predicted by the market electric power price predicting unit 106 according to the renewable energy index. Hereinafter, description will be made with reference to FIG. 9.

Figure 9:
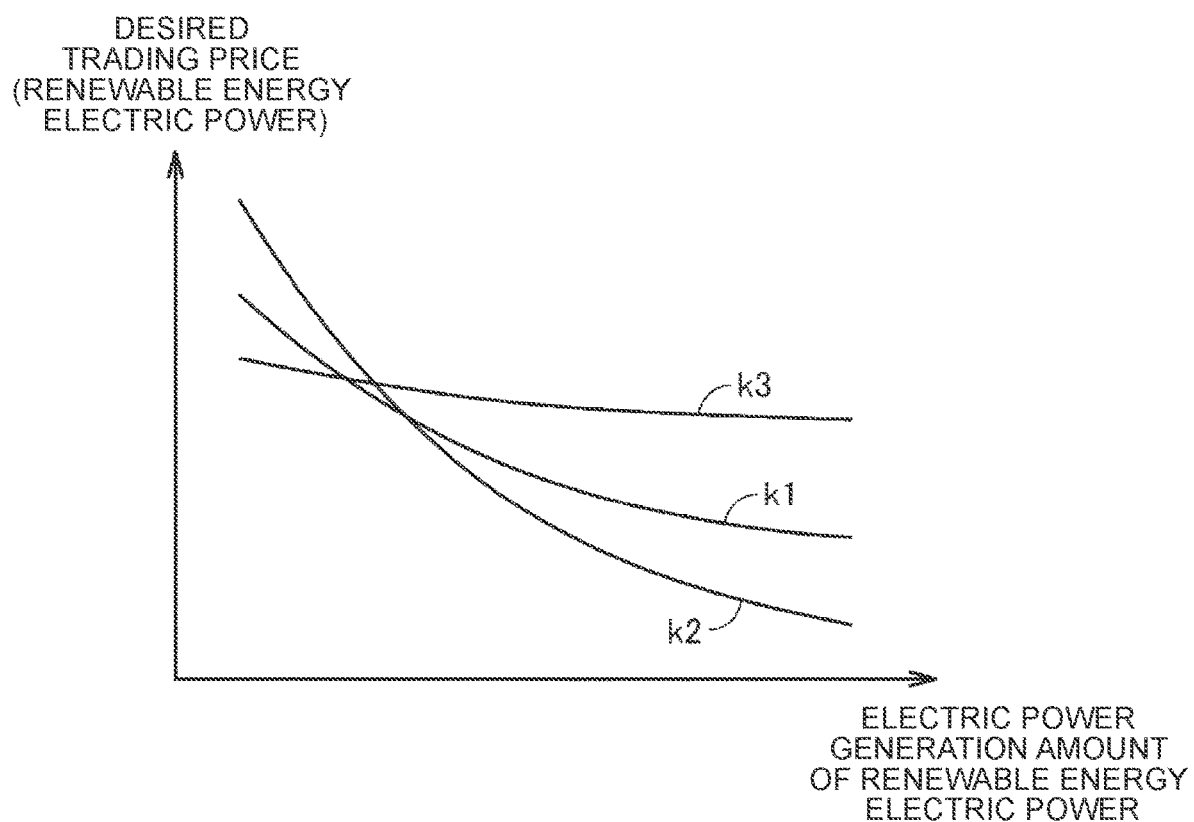
FIG. 9 is a diagram showing a relationship between a predicted electric power generation amount of renewable energy electric power and a desired trading price (unit price) of the renewable energy electric power.

FIG. 9 is a diagram showing a relationship between a predicted electric power generation amount of the renewable energy electric power and a desired trading price (unit price) of the renewable energy electric power. With reference to FIG. 9, a line k1 shows the price of the renewable energy electric power predicted by the market electric power price predicting unit 106 based on the electric power generation amount of the renewable energy electric power predicted by the renewable energy electric power generation amount predicting unit 104. As described above, when it is predicted that the electric power generation amount of the renewable energy is large, it is predicted that the price of the renewable energy electric power is low. On the other hand, when it is predicted that the electric power generation amount of the renewable energy is small, it is predicted that the price of the renewable energy electric power is high.

A line k2 indicates the desired trading price of the renewable energy electric power set by the trading price setting unit 110 when the renewable energy index is large (the desired renewable energy ratio is high). The line k2 is obtained by changing the line k1 such that the price fluctuation based on the predicted electric power generation amount of the renewable energy electric power increases with respect to the predicted price of the renewable energy electric power indicated by the line k1. That is, when the predicted electric power generation amount of the renewable energy electric power is large with respect to the predicted price of the renewable energy electric power indicated by the line k1, the trading price setting unit 110 sets the desired trading price of the renewable energy electric power to be lower than the predicted price. When the predicted electric power generation amount of the renewable energy electric power is small, the trading price setting unit 110 sets the desired trading price of the renewable energy electric power to be higher than the predicted price. As a result, in an electric power trading plan described below, a trading plan is created in which the renewable energy electric power is actively purchased during the time zone when the electric power generation amount of the renewable energy electric power is large.

A line k3 indicates the desired trading price of the renewable energy electric power set by the trading price setting unit 110 when the renewable energy index is small (the desired renewable energy ratio is low). The line k3 is obtained by changing the line k1 such that the price fluctuation based on the predicted electric power generation amount of the renewable energy electric power decreases with respect to the predicted price of the renewable energy electric power indicated by the line k1. That is, the trading price setting unit 110 sets the desired trading price such that the dependence of the electric power generation amount of the renewable energy electric power on the trading price of the renewable energy electric power becomes small. As a result, in the electric power trading plan described below, a trading plan is not created in which the renewable energy electric power is actively purchased as in the case where the renewable energy index is large.

The desired trading price of the non-renewable energy electric power is set to the predicted price predicted by the market electric power price predicting unit 106.

With reference to FIG. 8 again, the electric power consumption predicting unit 112 predicts the electric power consumption in the electric power storage device of the corresponding electric power resource. For example, in the case of the agent 2 (mobile body agent) of the electrified vehicle 5, the electric power consumption predicting unit 112 predicts the electric power consumption of the battery mounted on the electrified vehicle 5 due to the use (travel) of the electrified vehicle 5. The prediction result of the electric power consumption predicting unit 112 is used to set constraint conditions of the upper and lower limits of the SOC to be satisfied in the electric power storage device of the corresponding electric power resource when the electric power trading plan described below is created.

The electric power trading plan creating unit 114 creates the electric power trading plan (bidding plan) for conducting the electric power trading in the P2P electric power trading market based on the desired trading price set by the trading price setting unit 110 and the electric power consumption of the electric power resource predicted by the electric power consumption predicting unit 112. As an example, the electric power trading plan creating unit 114 creates a cost-optimized electric power trading plan under the constraint of the upper and lower limits of the SOC (chargeable and dischargeable range) to be satisfied in the electric power storage device of the corresponding electric power resource.

Specifically, the objective function Fcost for calculating the cost in the electric power trading is set, and under the constraint condition (chargeable and dischargeable range) of the upper and lower limits of the SOC to be satisfied in the electric power storage device of the corresponding electric power resource, electric energy to be traded for minimizing the objective function Fcost is searched. As an example, the objective function Fcost as shown in the following formula can be set.

[Formula 1]

$$Fcost(i, n) = \sum_{k=i}^{i+n} \{r(k) \cdot F(k)\} \quad (1)$$

Here, k (i to i+n, i is the current unit time zone) is a code of the unit time zone, and r(k) is a variable that becomes "1" when the electric power resource procures the electric power through the P2P electric power trading market in the unit time zone k, and becomes "0" in other cases. F(k) is a cost when the electric power resource procures the

[Formula 2]

$$F(k)=\{Qbr(k)-Qsr(k)\}\cdot Pr(k)+\{Qbn(k)-Qsn(k)\}\cdot Pn(k) \quad (2)$$

Here, Pr(k) is a desired trading price (unit price) of the renewable energy electric power set by the trading price setting unit 110, and Qbr(k) and Qsr(k) are electric energy desired to be purchased and electric energy desired to be sold in the renewable energy electric power in the unit time zone k, respectively. Pn(k) is a desired trading price (unit price) of the non-renewable energy electric power set by the trading price setting unit 110, that is, Pn(k) is a predicted price of the non-renewable energy electric power predicted by the market electric power price predicting unit 106. Qbn(k) and Qsn(k) are electric energy desired to be purchased and electric energy desired to be sold in the non-renewable energy electric power in the unit time zone k, respectively.

On the other hand, the SOC of the electric power storage device of the electric power resource is given by the following formula.

[Formula 3]

$$SOC(i, n) =$$

$$SOC(i) + \sum_{k=i}^{i+n} \{Qbr(k) + Qbn(k) - Qsr(k) - Qsn(k) - Qtrip(k)\}/C \quad (3)$$

Here, Qtrip(k) is a predicted value of the electric power consumption of the electric power resource in the unit time zone k. When the electric power resource is the electrified vehicle 5, Qtrip(k) is a predicted value of the electric power consumption due to the travel of the electrified vehicle 5 in the unit time zone k, and is calculated from the electricity cost and the like of the electrified vehicle 5. C is a conversion coefficient for converting the electric energy into the SOC.

Then, the upper limit value SOC_upper and the lower limit value SOC_lower are set for the SOC, and the constraint condition is set such that the SOC satisfies the following formula.

[Formula 4]

$$SOC\_lower \leq SOC(k) \leq SOC\_upper \quad (4)$$

As described above, for the objective function Fcost represented by the formula (1), a condition in which the objective function Fcost is minimized is searched while the SOC constraint condition represented by the formula (4) is satisfied (optimization of the objective function Fcost). For the optimization calculation of the objective function Fcost, any arithmetic method such as a linear programming method or a convex optimization method can be used.

As described above, in the first embodiment, the renewable energy index indicating the degree of procurement of the renewable energy electric power is set, and the desired trading price in consideration of the renewable energy index is set. Then, the electric power trading plan is created based on the objective function Fcost using the desired trading price in consideration of the renewable energy index. As a result, the degree of procurement of the renewable energy electric power can be reflected on the electric power trading plan, and the electric power trading plan in consideration of the degree of procurement of the renewable energy electric power can be created.

Figure 10:
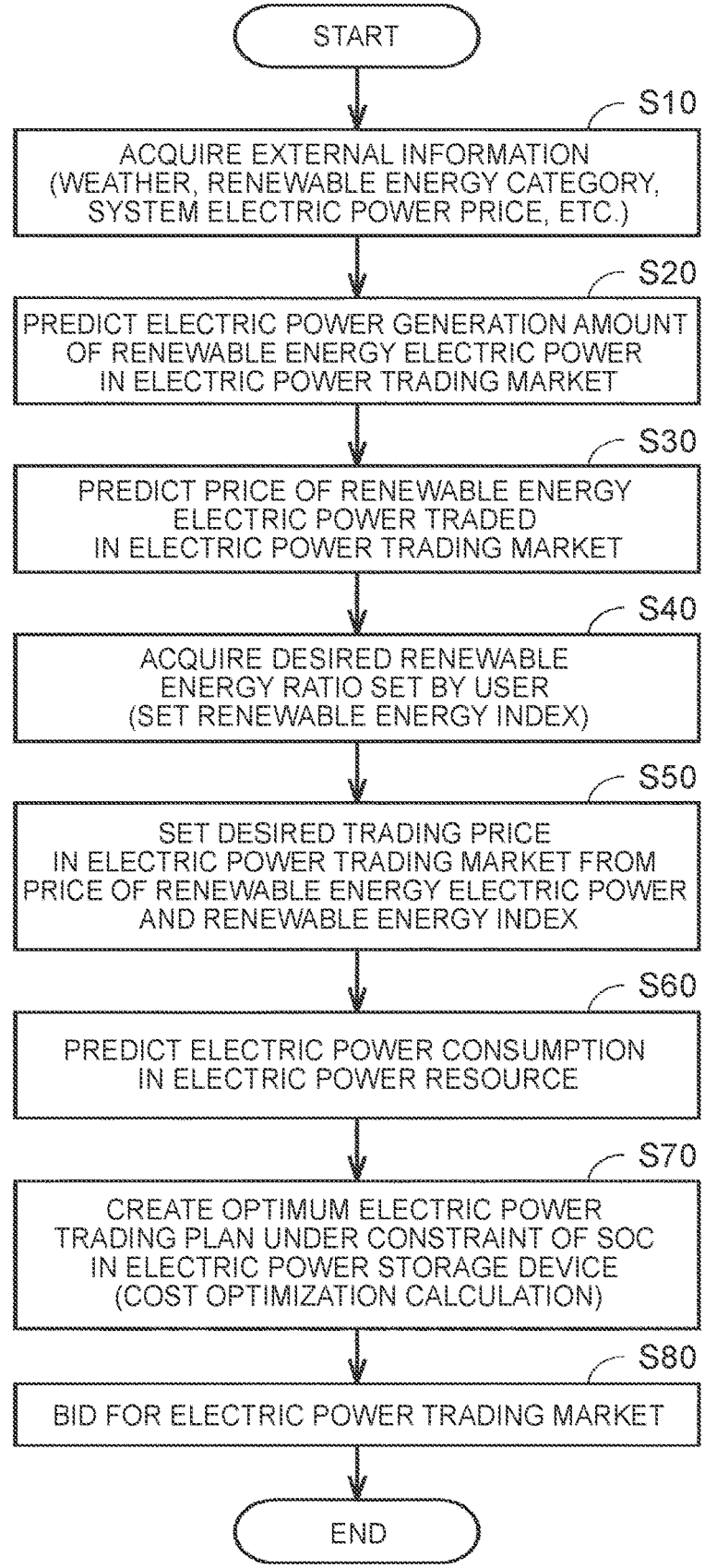
FIG. 10 is a flowchart showing an example of a processing procedure executed when the agent bids for the P2P electric power trading market.

FIG. 10 is a flowchart showing an example of a processing procedure executed when the agent 2 bids for the P2P electric power trading market. With reference to FIG. 10, the agent 2 (processor 21) acquires external information on the P2P electric power trading market for bidding from the external server device through the communication network 10 (step S10). The external information includes weather information (amount of solar radiation, weather, wind speed, etc.) of the area covered by the market, information on the electric power generation facility of the renewable energy in the market (solar power generation facility, wind power generation facility, hydroelectric power generation facility, etc.), and a cost and the like of the system electric power provided by the electric power company 9.

Next, the agent 2 predicts the electric power generation amount of the renewable energy electric power in the P2P electric power trading market for bidding based on the weather information acquired in step S10 and the information on the electric power generation facility of the renewable energy (step S20).

Then, the agent 2 predicts the price (unit price) of the renewable energy electric power traded in the market based on the electric power generation amount of the renewable energy electric power predicted in step S20 (step S30). Specifically, as shown by the line k1 in FIG. 9, when it is predicted that the electric power generation amount of the renewable energy is large, the agent 2 predicts that the price of the renewable energy electric power is low, and when it is predicted that the electric power generation amount of the renewable energy is small, the agent 2 predicts that the price of the renewable energy electric power is high.

Next, the agent 2 acquires the desired renewable energy ratio set by the user of the corresponding electric power resource from the input device, and sets the renewable energy index based on the desired renewable energy ratio (step S40). As described above, the renewable energy index is an index indicating the degree of the renewable energy electric power in the electric power purchased in the P2P electric power trading market for bidding (purchased electric power).

Then, the agent 2 sets the desired trading price in the P2P electric power trading market for bidding from the price of the renewable energy electric power predicted in step S30 and the renewable energy index set in step S40 (step S50). Specifically, as described with reference to FIG. 9, the price of the renewable energy electric power predicted in step S30 is changed according to the renewable energy index, so that the desired trading price of the renewable energy electric power is set. The desired trading price of the non-renewable energy electric power is set based on the price of the system electric power acquired in step S10.

Next, The agent 2 predicts the electric power consumption in the electric power storage device of the corresponding electric power resource (step S60). When the agent 2 is an agent (mobile body agent) of the electrified vehicle 5, the agent 2 predicts the electric power consumption of the battery due to the travel of the electrified vehicle 5 based on the past electricity cost.

Then, the agent 2 searches for the condition in which the objective function Fcost represented by the above formula (1) is minimized under the constraint of the SOC in the electric power storage device of the corresponding electric power resource represented by the above formula (4), so that the optimum electric power trading plan is created (step S70). That is, the agent 2 executes the cost optimization calculation using the formulas (1) to (4) and creates the bidding plan for the P2P electric power trading market.

When the electric power trading plan (bidding plan) is created in step S70, the agent 2 bids for the P2P electric power trading market (trading market server 3) based on the electric power trading plan (step S80).

As described above, in the first embodiment, the price of electric power (renewable energy electric power/non-renewable energy electric power) traded in the P2P electric power trading market is predicted. Further, the renewable energy index indicating the degree of the renewable energy electric power in the electric power purchased in the P2P electric power trading market is set. Then, the desired trading price in consideration of the degree of procurement of the renewable energy electric power is set from the predicted electric power price and the set renewable energy index, and the electric power trading plan is created based on the desired trading price. As described above, according to the first embodiment, it is possible to create the electric power trading plan in consideration of the degree of procurement of the renewable energy electric power.

Further, in the first embodiment, the electric power generation amount of the renewable energy electric power traded in the market is predicted based on the weather information of the area covered by the P2P electric power trading market, and the price of the renewable energy electric power is predicted based on the prediction result. Therefore, the price of the renewable energy electric power can be appropriately predicted. As a result, the desired trading price is appropriately set, and the appropriate electric power trading plan can be created based on the desired trading price.

Further, in the first embodiment, the electric power consumption of the electric power resource is predicted, and the electric power trading plan is created from the prediction result and the desired trading price. Therefore, the appropriate electric power trading plan can be created based on the prediction of the electric power consumption of the electric power resource.

Further, in the first embodiment, the renewable energy index is a ratio of the renewable energy electric power in electric power purchased in the electric power trading market, the ratio of the renewable energy electric power being set based on the input from the user. Therefore, it is possible to create the electric power trading price on which the user's wish is reflected for the above ratio of the renewable energy electric power.

Second Embodiment

In the first embodiment described above, the user of the corresponding electric power resource sets the ratio of the renewable energy electric power (desired renewable energy ratio) in the purchased electric power from the input device, and the renewable energy index is set based on the desired renewable energy ratio. In a second embodiment, the renewable energy index is set based on the ratio of the renewable energy electric power in the electric power purchased in the P2P electric power trading market in the past (renewable energy usage ratio).

Figure 11:
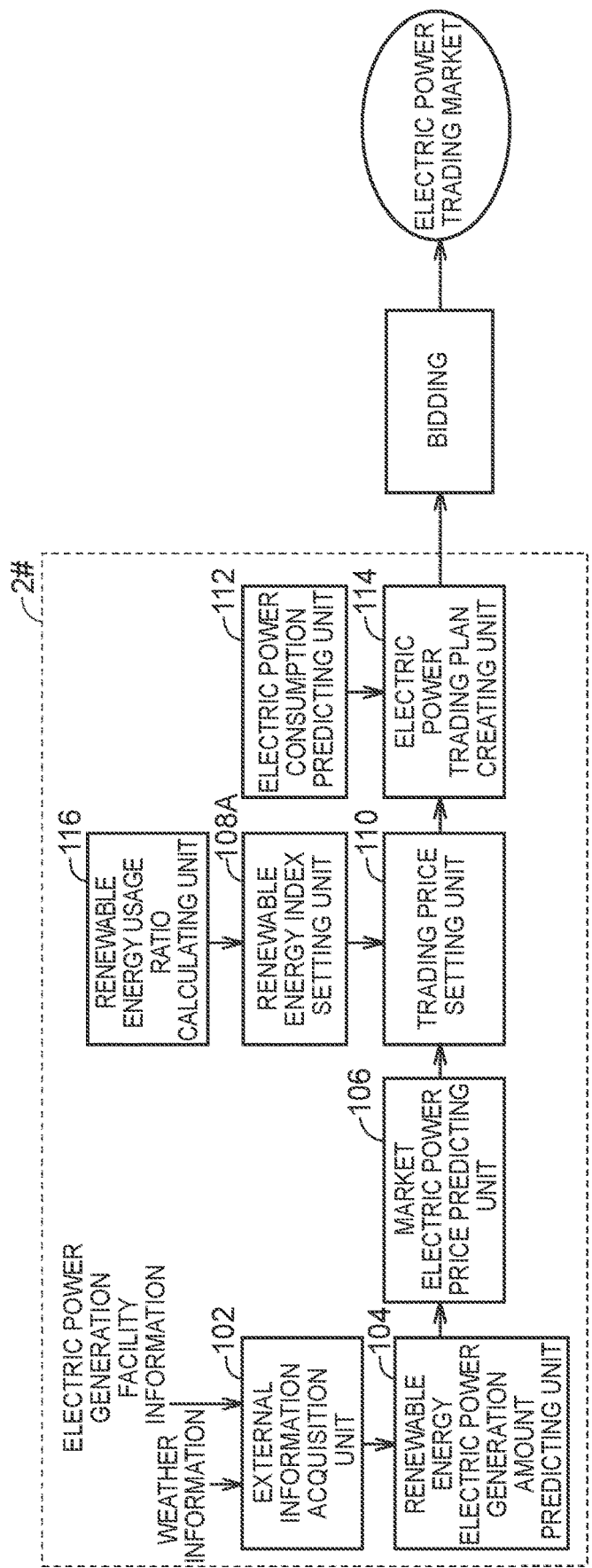
FIG. 11 is a block diagram functionally showing a configuration of an agent according to a second embodiment.

FIG. 11 is a block diagram functionally showing a configuration of an agent according to the second embodiment. With reference to FIG. 11, an agent 2 # further includes a renewable energy usage ratio calculating unit 116 in the configuration of the agent 2 according to the first embodiment shown in FIG. 8, and includes a renewable energy index setting unit 108A instead of the renewable energy index setting unit 108.

The renewable energy usage ratio calculating unit 116 calculates the ratio of the renewable energy electric power in the electric power purchased through the P2P electric power trading market in the past predetermined period (renewable energy usage ratio). The predetermined period can be set as appropriate, and is, for example, several months. Then, the renewable energy usage ratio calculating unit 116 sets the ratio of the renewable energy electric power (trading renewable energy ratio) in the electric power trading to be bid for this time based on the calculated past renewable energy usage ratio. For example, when the past renewable energy usage ratio is lower than the appropriately set reference ratio, the renewable energy usage ratio calculating unit 116 sets the trading renewable energy usage ratio to a higher value than the past renewable energy usage ratio in order to increase the renewable energy usage ratio.

Then, the renewable energy index setting unit 108A sets the renewable energy index based on the trading renewable energy ratio set by the renewable energy usage ratio calculating unit 116. Specifically, the renewable energy index is set as appropriate such that the higher the trading renewable energy ratio is, the larger the renewable energy index is, and the lower the trading renewable energy ratio is, the smaller the renewable energy index is.

Other functions of the agent 2 # are the same as those of the agent 2 according to the first embodiment shown in FIG. 8.

FIG. 12 is a flowchart showing an example of a processing procedure executed when the agent 2 # according to the second embodiment bids for the P2P electric power trading market. This flowchart corresponds to the flowchart of FIG. 10 described in the first embodiment.

With reference to FIG. 12, the processes of steps S110 to S130 and S150 to S180 are the same as the processes of steps S10 to S30 and S50 to S80 of the flowchart shown in FIG. 10, respectively.

In this flowchart, when the price (unit price) of the renewable energy electric power traded in the P2P electric power trading market for bidding is predicted in step S130, the agent 2 # calculates the trading renewable energy ratio in the electric power trading to be bid for this time based on the renewable energy usage ratio in the past predetermined period, and sets the renewable energy index based on the trading renewable energy ratio (step S140).

Then, when the renewable energy index is set, the agent 2 # shifts the process to step S150, and the desired trading price in the P2P electric power trading market for bidding is set from the price of the renewable energy electric power predicted step S130 and the renewable energy index set in step S140.

As described above, in the second embodiment, the trading renewable energy ratio in the electric power trading to be bid for this time is calculated based on the renewable energy usage ratio in the past predetermined period, and the renewable energy index is set based on the trading renewable energy ratio. Therefore, it is possible to create the electric power trading plan based on the renewable energy usage ratio in the past predetermined period. For example, when the above ratio of renewable energy electric power in the predetermined period is low, the electric power trading plan can be created such that the ratio is increased.

Modification

As described above, in the first embodiment, the renewable energy index indicating the degree of the renewable energy electric power in the electric power purchased in the P2P electric power trading market (purchased electric power) is set based on the desired renewable energy ratio of the user. In the second embodiment, the renewable energy index indicating the degree of the renewable energy electric power in the electric power purchased in the P2P electric power trading market (purchased electric power) is set based on the trading renewable energy ratio according to the renewable energy usage ratio in the past predetermined period. However, the renewable energy index may be set based on other parameters.

Specifically, the renewable energy index may be set based on a predetermined law applied to the corresponding electric power resource. For example, in a case where the corresponding electric power resource is the electrified vehicle 5, and the usage ratio of the renewable energy used when the electrified vehicle 5 enters a certain area (nature conservation area, etc.) is stipulated by the ordinance and the like, the renewable energy index may be set based on the renewable energy usage ratio specified in the ordinance.

Alternatively, the renewable energy index may be set based on a predetermined tax system applied to the corresponding electric power resource. For example, when the corresponding electric power resource is the electrified vehicle 5, and the tax rate such as the environmental tax is set based on the usage ratio of the renewable energy determined according to the year of manufacture of the electrified vehicle 5, the renewable energy index may be set based on the renewable energy usage ratio applied to the electrified vehicle 5.

The embodiments disclosed this time should be considered to be exemplary and not restrictive in all respects. The technical scope of the present disclosure is determined based on the statements in the scope of claims rather than the description of the embodiments described above, and is intended to include all modifications within the meaning and scope equivalent to the scope of claims.

What is claimed is:

1. An information processing device that creates an electric power trading plan for causing an electric power resource to conduct electric power trading through an electric power trading market, the electric power resource being configured to be able to receive electric power at least from outside the electric power resource, the information processing device comprising:
   a price predicting unit that predicts a trading price of electric power traded in the electric power trading market, the trading price comprising:
      a first price that indicates a price of renewable energy electric power; and
      a second price that indicates a price of non-renewable energy electric power that is not applicable to the renewable energy electric power;
   an index setting unit that sets a renewable energy index indicating a degree of the renewable energy electric power in electric power purchased in the electric power trading market,
   wherein the renewable energy index is based on a renewable energy ratio that is desired and set by a user;
   a trading price setting unit that sets a desired trading price in the electric power trading plan from a prediction result of the price predicting unit and the renewable energy index; and
   a trading plan creating unit that creates the electric power trading plan based on the desired trading price.

2. The information processing device according to claim 1, further comprising an electric power generation amount predicting unit that predicts an electric power generation amount of the renewable energy electric power traded in the electric power trading market, wherein the price predicting unit predicts the first price based on a prediction result of the electric power generation amount predicting unit.

3. The information processing device according to claim 2, wherein the electric power generation amount predicting unit predicts the electric power generation amount of the renewable energy electric power based on weather information of an area covered by the electric power trading market.

4. The information processing device according to claim 1, further comprising an electric power consumption predicting unit that predicts electric power consumption of the electric power resource, wherein the trading plan creating unit creates the electric power trading plan from the desired trading price and a prediction result of the electric power consumption predicting unit.

5. The information processing device according to claim 1, wherein the renewable energy ratio that is desired and set by the user is a ratio of the renewable energy electric power in the electric power purchased in the electric power trading market.

6. The information processing device according to claim 1, wherein the index setting unit sets the renewable energy index based on a ratio of the renewable energy electric power in the electric power purchased in the electric power trading market in a predetermined period.

7. The information processing device according to claim 5, wherein the trading price setting unit sets the desired trading price based on the prediction result of the price predicting unit and the ratio of the renewable energy electric power set according to the renewable energy index.

8. The information processing device according to claim 1, wherein the index setting unit sets the renewable energy index based on a predetermined law applied to the electric power resource.

9. The information processing device according to claim 1, wherein the index setting unit sets the renewable energy index based on a predetermined tax system applied to the electric power resource.

\* \* \* \* \*

UNITED STATES PATENT AND TRADEMARK OFFICE
CERTIFICATE OF CORRECTION

PATENT NO. : 12,248,982 B2
APPLICATION NO. : 17/943535
DATED : March 11, 2025
INVENTOR(S) : Yuki Kudo et al.

Page 1 of 1

It is certified that error appears in the above-identified patent and that said Letters Patent is hereby corrected as shown below:

On the Title Page

Add item (30), as follows:
(30) Foreign Application Priority Data
September 29, 2021 (JP) ............ 2021-159140

Signed and Sealed this
Fifteenth Day of July, 2025

Coke Morgan Stewart
*Acting Director of the United States Patent and Trademark Office*